United States Patent
Wason et al.

(10) Patent No.: US 7,404,194 B2
(45) Date of Patent: *Jul. 22, 2008

(54) CROSS-PLATFORM FRAMEWORK-INDEPENDENT SYNCHRONIZATION ABSTRACTION LAYER

(75) Inventors: Andrew Wason, Atlantic Highland, NJ (US); Michael Mills, Holmdel, NJ (US); Chris O'Brien, Brooklyn, NY (US); Bruce A. Wallace, Short Hills, NJ (US)

(73) Assignee: Mediaplatofrm On-Demand, Inc., Beverly Hills, CA (US)

( * ) Notice: Subject to any disclaimer, the term of this patent is extended or adjusted under 35 U.S.C. 154(b) by 917 days.

This patent is subject to a terminal disclaimer.

(21) Appl. No.: 10/719,641

(22) Filed: Nov. 21, 2003

(65) Prior Publication Data

US 2004/0225994 A1    Nov. 11, 2004

Related U.S. Application Data

(63) Continuation of application No. 09/338,188, filed on Jun. 22, 1999, now Pat. No. 6,701,383.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................. 719/328; 717/114

(58) Field of Classification Search ......... 717/100–123; 719/310–320, 328–332
See application file for complete search history.

(56) References Cited

U.S. PATENT DOCUMENTS 5,452,435 A    9/1995 Malouf et al.

(Continued)

OTHER PUBLICATIONS

Zheng et al, MMwb: A Multimedia Whiteboard for Distance Learning Applications, University of Ottawa, 1998, pp. 1-8.*

(Continued)

*Primary Examiner*—Meng-Ai An
*Assistant Examiner*—Diem K Cao
(74) *Attorney, Agent, or Firm*—Kleinberg & Lerner, LLP; Marvin H. Kleinberg

(57) ABSTRACT

This invention is a synchronization abstraction layer (SAL) providing a uniform interface to frameworks operating on sequenced flow data. It allows content developers to design and build interactive content that will operate interchangeably in different multimedia frameworks (e.g., Apple Computer, Inc.'s QuickTime™, Microsoft Corporation's NetShow™, RealNetworks, Inc.'s RealPlayer™, Sun Microsystems, Inc.'s Java™ Media Framework) and on different hardware platforms (e.g., desktop PC, Macintosh™, Television set-top boxes such as those from General Instrument Corporation and Scientific Atlanta Inc., Inc., Internet appliances such as AOL™-TV, and other appliances, e.g., a kitchen Internet radio). The uniform interface is independent of the particular framework and the platform on which the SAL is implemented, so that a single instance of content, whether created in Java™, JavaScript, VBscript, HTML, XML, or some other language, can run appropriately on different hardware, e.g., on a Television set-top and on a desktop PC.

In one realization, the synchronization abstraction layer provides a Java™ VIRTUAL MACHINE (JVM) interface for running Java™ plug-ins for streaming media applications such as Real Networks, Inc.'s RealPlayer™, Microsoft Corporation's Windows Media Technologies (NetShow™), Apple Computer, Inc.'s QuickTime™, Sun Microsystems, Inc.'s Java™ Media Framework. The JVM interface allows third-party developers to design platform- and framework-independent plug-ins for streaming media applications.

This invention allows content providers to use plug-ins or compatible software objects (such as Java™ applets) to build, for example, interactive streaming media content that is fully interactive but independent of the particular underlying hardware and software technologies, such as RealNetworks™ G2, Microsoft Corporation's NetShow™, a desktop PC, or a television.

4 Claims, 5 Drawing Sheets

U.S. PATENT DOCUMENTS

| | | | |
|---|---|---|---|
| 5,893,106 A | | 4/1999 | Brobst et al. |
| 5,903,728 A | | 5/1999 | Semenzato |
| 6,018,743 A | * | 1/2000 | Xu .......................... 707/103 R |
| 6,085,120 A | | 7/2000 | Schwerdtfeger et al. |
| 6,401,081 B1 | * | 6/2002 | Montgomery et al. ......... 705/63 |
| 6,460,089 B1 | * | 10/2002 | Romano et al. ............. 719/310 |
| 6,865,728 B1 | * | 3/2005 | Branson et al. ............. 717/108 |

OTHER PUBLICATIONS

Day, B., Progress on the JMF and Java Media APIs, JavaWorld.com, Jun. 1999.
Jaworski, Jamie, Java Developer's Guide (1996).
QUE®, Special Edition Using HTML 4 (1997).
W3C®, Synchronized Multimedia Integration Language (SMIL) 1.0 Specification, Jun. 15, 1998.
Kramer, Douglas, The Java™ Platform, A White Paper, May 1996.
Introduction To Java Media Programming, JavaWorld online, Jun. 1998.
Sun Microsystems et al., Java Media Players, Nov. 6, 1997.
Jaworski, Jamie, Java 1.2 Unleashed, 1998.
Apple, QuickTime Technology Brief: QuickTime 3.0, Apr. 1997, Apple computer.
Sellers, QuickTime 3.0- an Overview, Maccentral.
"An Open Medical Imaging Workstation Architecture for Platform-Independent 3-D Medical Image Processing and Visualization", Domagoj Cosic, Dec. 1997, IEEE Transactions on Information Technology in Biomedicine, vol. 1, No. 4, pp. 279-283.
"ConverStation/2: An Extensible and Customizable Realtime Multimedia Conferencing System", Nakajima et al., May 1994, Multimedia Communications, pp. 9/1/1-9/1/6.
"A Multimedia Teleteaching System Using an Electronic Whiteboard for Two-Way Communication of Motion Videos and Chalkboards", Nakajima et al., Jul. 1993—IEEE International Workshop on Robot and Human Communication, pp. 436-441.

* cited by examiner (toc.rj)

```
<?xml version ="1.0"?>
<object
        classid ="com.softcom.realjava.plugins.RealTOC"
        codebase ="../../website/demos/plugins/codebase/"
        archive ="plugin.jar,sax.jar,aelfred.jar"
        width ="352" height ="350"
        sync ="1000"
        duration ="900000"
        >
        <param name ="URL" value ="toc.xml" />
</object>
```

*Fig. 4*

(toc.smi)

```
<smil>
    <head>
        <layout>
            <region id ="videoRegion" left ="0" top ="0"
Width ="176" height ="120"
            fit ="meet"/>
            <region id ="tocRegion" left ="0" top ="120"
Width ="176" height ="200"
            fit ="fill"/>
        </layout>
    </head>
    <body>
        <par>

<video id ="video"
src ="rtsp://demo.softcom.com/heat/video/heatsuresmooth.rm"
region ="videoRegion"/>
            <ref id ="toc" src ="toc.rj" region ="tocRegion"
            fill ="freeze" />
        </par>
    </body>
</smil>
```

*Fig. 6*

(toc.xml)

```xml
<?xml version ="1.0"?>
<TOC>
    <NODE BEGIN ="0ms" END ="38684ms">
        <TITLE>Acknowledgements</TITLE>
    </NODE>
    <NODE BEGIN ="38685ms" END ="57627ms">
        <TITLE>Body Temperature</TITLE>
    </NODE>
    <NODE BEGIN ="57628ms" END ="68999ms">
        <TITLE>Exercise</TITLE>
        <NODE BEGIN ="69000ms" END ="96757ms">
            <TITLE>Thermoregulatory System</TITLE>
        </NODE>
    </NODE>
    <NODE BEGIN ="96758ms" END ="126114ms">
        <TITLE>Course Overview </TITLE>
    </NODE>
    <NODE BEGIN ="126115ms" END ="319999ms>
        <TITLE>Body Temperature</TITLE>
    </NODE>
    <NODE BEGIN ="320000ms" END ="323335ms">
        <TITLE>Heat Related Illness</TITLE>
        <NODE BEGIN ="323336ms" END ="371783ms">
            <TITLE>Heat Fatigue</TITLE>
        </NODE>
        <NODE BEGIN ="371784ms" END ="398749ms">
            <TITLE>Heat Cramps</TITLE>
        </NODE>
        <NODE BEGIN ="398750ms" END ="437021ms">
            <TITLE>Heat Collapse</TITLE>
        </NODE>
        <NODE BEGIN ="437022ms" END ="510601ms">
            <TITLE>Heat Exhaustion</TITLE>
        </NODE>
        <NODE BEGIN ="510602ms" END ="560999ms">
            <TITLE>Heat Stroke</TITLE>
            <NODE BEGIN ="561000ms" END ="590898ms">
                <TITLE>Symptoms</TITLE>
            </NODE>
            <NODE BEGIN ="590899ms" END ="654966ms">
                <TITLE>Treatment</TITLE>
            </NODE>
        </NODE>
    </NODE>
    <NODE BEGIN ="654967ms" END ="900000ms">
        <TITLE>Precautions</TITLE>
    </NODE>
</TOC>
```

Fig. 5

CROSS-PLATFORM FRAMEWORK-INDEPENDENT SYNCHRONIZATION ABSTRACTION LAYER

CROSS-REFERENCE TO RELATED APPLICATION

This application is a continuation of U.S. application Ser. No. 09/338,188 filed on Jun. 22, 1999 now U.S. Pat. No. 6,701,303.

APPENDIX AND COPYRIGHT NOTICE

This document includes a partial source code listing of a preferred embodiment of the applicant's invention. The code, listed in Appendix A and in the drawings, forms part of the disclosure of the specification. It is copyrighted. The copyright owner has no objection to facsimile reproduction by anyone of the patent document, including the copyrighted Appendix A and the drawings as they appear in the Patent and Trademark Office file or records, but otherwise reserves all rights.

TECHNICAL FIELD

This invention relates to the field of software plug-ins for multimedia file players and for other applications supporting ordered data flow files. More precisely, this invention defines a new field of software that allows plug-ins and content to be insulated from differences in underlying platforms and frameworks.

BACKGROUND OF THE INVENTION

Multimedia player frameworks have become widespread. Later versions of the most popular Internet browsers—Microsoft's Internet Explorer and Netscape's Communicator—include at least one player in the basic package. These are frameworks such as RealNetworks, Inc.'s RealPlayer™ G2 family (collectively, the "RealPlayer™"); Microsoft Corporation's Windows Media Technologies (NetShow™); Macromedia, Inc.'s Director™; Apple Computer, Inc.'s QuickTime™; and Sun Microsystems, Inc.'s Java™ Media Framework (JMF). Most of these frameworks are extensible by means of plug-ins discussed below; some, notably JMF, are extensible by means of applications built on top of the frameworks. By being extensible we mean that a particular framework supports a set of interfaces exposed for interaction with additional software modules or components.

A framework is a set of interfaces, e.g., API's and procedures, and a set of capabilities exposed for the purposes of extensibility. It need not operate on multimedia-type files, i.e., files ordered sequentially and supporting the concept of a time-line; frameworks generally need not operate on time- or otherwise-ordered data files. In the rest of this document, however, we will discuss predominantly frameworks operating on ordered data flow files. We will refer to such frameworks interchangeably as "frameworks," "extensible frameworks," "extensible data flow-based frameworks," or by similar expressions; we do not imply any difference in the particular designation used, unless otherwise indicated.

Frameworks are extended by means of extensions, for example plug-ins. Plug-ins, also referred to as extension modules, are modules or components dynamically loaded at runtime. Extensible architecture and plug-ins have been used in commercial products, the RealPlayer™ and Windows Media Technologies being two instances. They also have been described in various publications. See U.S. Pat. Nos. 5,838,906 and 5,870,559. (The specifications of these patents are incorporated by reference as if fully set forth herein.) A number of companies market plug-ins specifically for extending multimedia players.

OBJECTS OF THE INVENTION

One difficulty faced by plug-in developers is that a plug-in must be ported for each platform, i.e., for each hardware-operating system combination. Another difficulty lies in adapting a plug-in to various frameworks. Third difficulty, closely related to the first two, is that platform porting and framework adaptation require developers to have working knowledge of the various platforms and frameworks. One object of this invention is to provide a single interface that allows plug-in developers to build a single, platform independent version of a plug-in. Another object of this invention is to provide a uniform interface to the various frameworks so that a single plug-in can extend functionality of multiple frameworks. The third object of this invention is to facilitate development of content that can operate similarly, i.e., consistently, with different multimedia players (e.g., RealNetworks, Inc.'s RealPlayer™ and Microsoft Corporation's Windows Media Technologies (NetShow™)), and platforms (TV, PC, set-top boxes). The fourth object of this invention invention is to accelerate the development of content and multimedia plug-ins by promoting reuse of existing software objects (e.g., objects written in Java™ and JavaScript).

SUMMARY OF THE INVENTION

This invention is an abstraction layer providing a-uniform interface between a framework and one or more plug-ins. In the preferred embodiment, the invention is a Synchronization Abstraction Layer (SAL) abstracting time-based frameworks into a common synchronization interface. The SAL synchronizes itself and other plug-ins to a time-line of the underlying framework—and it does that independently of the underlying framework. In other words, the plug-ins interact with the underlying framework through the SAL, rather than directly. Typically, the SAL is implemented on top of the synchronization of the Application Programming Interfaces (API's) provided by the underlying frameworks. It has at least one point of coupling with the underlying framework: a method for providing the SAL with the current time.

The SAL includes a uniform cross-platform interface for the plug-ins. Preferably, the cross-platform interface has a functional core independent of the specific framework underlying the SAL.

Some of the features of this invention are listed below:
1. Secure e-commerce, full interactive experiences including text and voice chat, games, graphics, animations, and advertising can be integrated and synchronized with streaming multimedia such as video and audio;
2. It can be used to build a content framework that insulates content and plug-in developers from details and differences in hardware platforms, so that the same content or plug-in can run on desktop platforms (PC, Macintosh, Solaris, Linux), Televisions (GI, SA), or other kinds of devices (AOL-TV, screen phones);
3. It can be used to build a content framework that insulates content and plug-in developers from specifics of, or differences in, software platforms, so that the same content or plug-in can run on Microsoft NetShow™, RealNetworks RealPlayer™, Apple Quicktime™, Sun Java™ Media Framework or any other media system;

4. It can run without a network or on different types of networks, such as wireless, Intranets, or the Internet;
5. It can be used to synchronize arbitrary data types, including text, chat, graphics, video, audio, and active content like Java™, JavaScript, or Flash;
6. The framework-independent layer can be implemented using different languages, including Java™, HTML, XML, JavaScript, VBScript, or other languages;
7. When used for video synchronization, it can be used to synchronize arbitrary datatypes with different spatial objects in video, and with different temporal objects in video.

BRIEF DESCRIPTION OF THE DRAWINGS

FIG. 3 is a high level diagram of a preferred embodiment implementation specific to a table of contents plug-in.

FIG. 4 lists a sample toc.rj, an XML descriptor file for a table of contents plug-in of the previous Figure.

FIG. 5 lists a sample toc.xml, an XML descriptor file with detailed hierarchical description of the table of contents plug-in of FIG. 3.

FIG. 6 lists a sample toc.smi, an XML file defining a set of synchronized plug-ins.

DETAILED DESCRIPTION OF THE INVENTION

Figure 1:
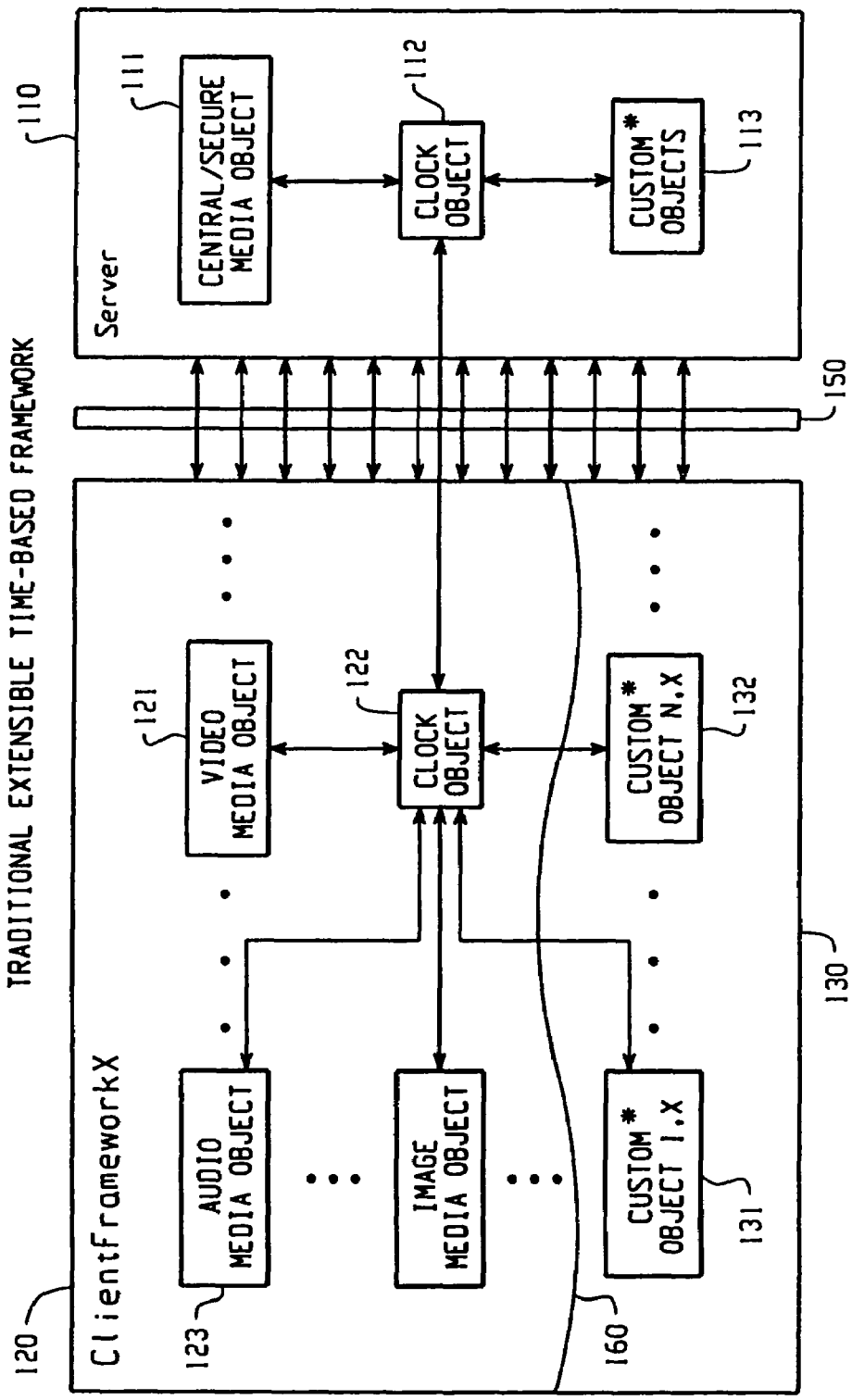
FIG. 1 is a diagram of basic processes in a traditional extensible time-based framework of prior art.

FIG. 1 depicts conventional operation of an extensible multimedia player framework connected to a media server. Server 110 includes Media Object 111, Clock Object 112, and Custom Objects 113. Framework 120 and Extension Module (plug-in) 130 coexist on the client side. As is usual for a media player, Framework 120 contains Video Media Object 121, Clock Object 122; and Audio Media Object 123. Extension Module 130 has Custom Objects 131 and 132. Server 110 connects to Framework 120 and Extension Module 130 through Network 150. Line 160 indicates the extensibility interface between Framework 120 and Extension Module 130. Note that this high level diagram of prior art omits many other components and processes, including an operating system and rendering means.

Figure 2:
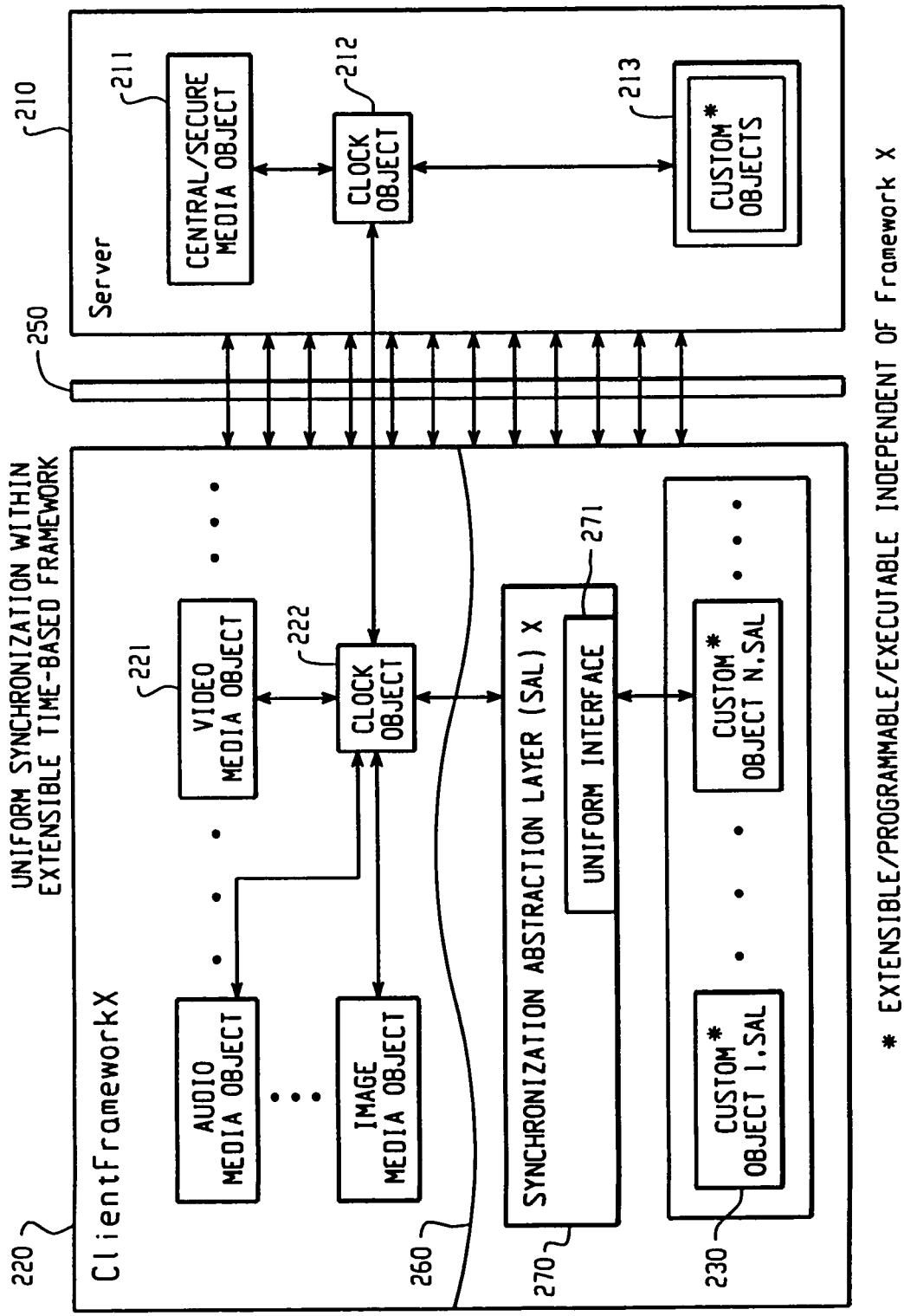
FIG. 2 is a diagram of basic processes in an extensible time-based framework incorporating the Synchronization Abstraction Layer in accordance with this invention.

FIG. 2 demonstrates an arrangement functionally similar to the arrangement of FIG. 1, but using the present invention. Server 210, including Media Object 211, Clock Object 212, and Custom Objects 213, connects to Framework 220, Extension Module (plug-in) 230, and Synchronization Abstraction Layer (SAL) 270 through Network 250. Line 260 symbolizes the interface extending Framework 220 through SAL 270. Block 271 denotes Uniform Interface between SAL 270 and various extension modules, including Extension Module 230.

As before, FIG. 2 omits many other components and processes, and is rather generalized. But a number of structural changes can be envisioned even in this, high level representation. For instance, media files can be stored locally, obviating the need for transmission over the network. Further, custom objects need not reside on the same server as the media files; they may be located on a separate server or, in some cases, locally. Several extension modules can be simultaneously connected to the same client framework, either through the SAL or directly. (The SAL itself is, of course, an extension module.)

The discussion above focused on media players rendering multimedia files supporting the concept of time-line, such as video and audio clips, because these applications are commercially important. The invention, however, is not limited to rendering multimedia or time-line ordered files. Time-line sequencing is only one example of data flow order within files, including media files. Many other types of ordering are possible. As one example, consider a video taken from a window of a car going down a highway. The images can be time- or distance-sequenced.

Files of-interest in the present context, which we designate as ordered data flow files, may also be ordered in multiple dimensions. Imagine a video game called "Tank Commander," with the player controlling a virtual tank moving cross country. Because the tank can move in two dimensions, the top view of the tank and its immediate surroundings depends on two coordinates. The video data must therefore be ordered in two dimensions. Similarly, video of a one-directional view from an object moving in three dimensions requires three dimensional ordering. Clearly, the concept of ordered files goes beyond the four dimensions of space-time.

We also need not limit this concept to files ordered according to variables perceived as continuous, e.g., space and time. The concept is equally applicable to ordering according to discrete variables, such as event occurrences or quantized-space positions. As an example, consider a server storing a library of books and sending the content to the client for sequential viewing page by page. The concept of ordered data flow files is therefore a general one.

Finally, in its general form the invention need not synchronize data flow, but may merely provide a uniform cross-platform interface for plug-ins.

Although the invention can be implemented in various languages, it is preferable to use a platform-independent source code. Therefore, consistent with the spirit of the invention, its preferred embodiment is implemented in Java™—an architecture-neutral, object-oriented, multithreaded language intended for use in distributed environments. (Partial source code of the preferred embodiment is listed in Appendix A and constitutes a part of the disclosure of this specification.) The Java™ code is executed by a Java™ Virtual Machine (JVM), which is a byte-code interpreter. The JVM is stored in one location and instantiated separately for each extension module, eliminating the need to store duplicate copies of the JVM for other modules that are also implemented in Java™.

Alternatively, the invention can instantiate a JVM from a copy in the framework, in the operating system, or even in another application.

The preferred embodiment creates a-uniform interface to the RealPlayer™ of Real Networks. It can be easily adapted to extend other multimedia players in addition to the RealPlayer™, especially if a common set of functional features exists in the various players. This should be the case for most multimedia players. Because the Java™ code of a specific extension can be mostly independent of a particular framework being extended, large sections of the SAL's code can be shared among different framework adaptations of the same plug-in.

Figure 3:
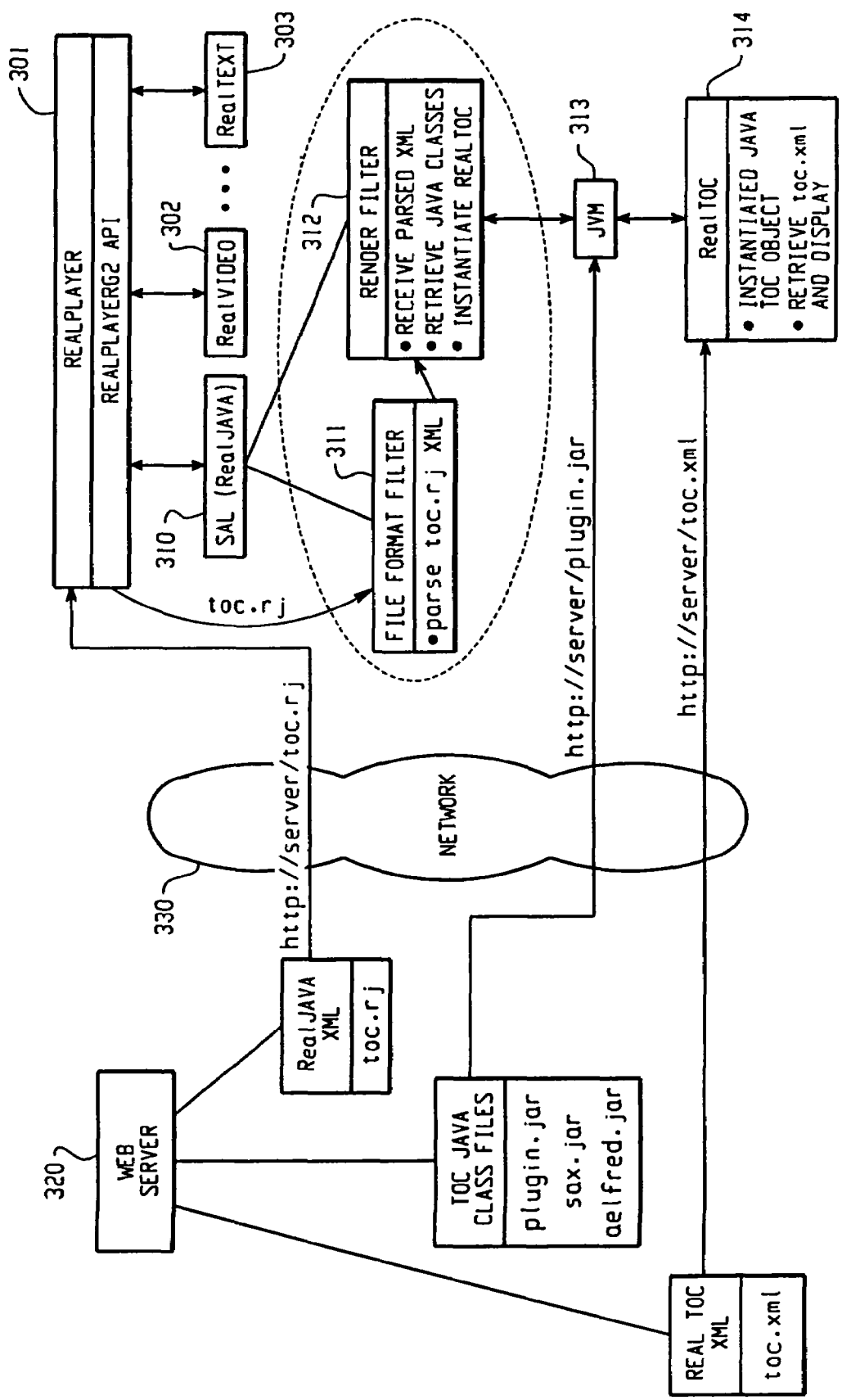

FIG. 3 illustrates a high level diagram of a more specific example of the preferred embodiment. Here, the SAL is used to plug-in a table of contents ("TOC") extension module into the RealPlayer™. The TOC plug-in displays a hierarchical view of the table of contents of a video presentation described in the table of contents. In the hierarchy, entries in the table are highlighted during the video presentation of their associated video portions. A user can randomly access various-portions of the video by clicking on the corresponding entries in the TOC.

In this configuration RealPlayer™ 301 has three extension modules: SAL (RealJava) 310, RealVideo 302, and RealText 303. (Hereinafter we denominate by "rj" or "RealJava" all Java™ objects compatible with the G2 architecture.) For clarity, SAL 310 is expanded within the dotted oval into its conceptual components—File Format Filter 311 and Renderer 312. This conceptual separation results from the G2 architecture constraints of the RealPlayer™; in a SAL adaptation compatible with another media player, such conceptual separation may be inappropriate.

When a user invokes the RealPlayer™ application and the TOC extension module, RealPlayer™ 301 accesses Web Server 320 over Network 330 to retrieve "toc.smi," a synchronized multimedia integration language ("SMIL") descriptor file defining a set of synchronized plug-ins to run simultaneously in the RealPlayer™ environment. This file contains a reference to "toc.rj," an extensible markup language ("xml") descriptor file for the table of contents extension module compatible with the RealPlayer™. Based on the MIME type of the toc.rj file, RealPlayer™ 301 instantiates SAL 310 and routes the toc.rj file to it. SAL 310 includes File Format Filter 311 and Renderer 312, each implemented using Java™ code linked with native platform C++ code.

File Format Filter 311 parses the toc.rj file and hands it over to Renderer 312 through a standard protocol defined by the RealPlayer™. The parsed data contains following elements: (1) name of the Java™ class to instantiate; (2) location from which the Java™ class can be retrieved; and (3) any other parameters specific to the extension module. A sample toc.rj file appears in FIG. 4. The first line (starting with classid) specifies the Java™ class names; the next two lines (codebar and archive) specify a URL location and names of Java™ class files; the following line assigns the width and the height of the window for the table of contents; sync is the period in milliseconds between synchronizing events, i.e., between timing calls from the RealPlayer™ to the SAL; duration refers to total length of the time-line of the presented event; and, lastly, param is the parameter that points to the URL with the toc.xml file, the XML file descriptor of the specific table of contents.

Renderer 312 instantiates JVM (Java™ Virtual Machine) 313 needed to run the Java™ code, and also retrieves ".jar" files (packaged Java™ class files) over Network 330. Note that the URL for the ".jar" files is available from the parsed toc.rj file discussed above. Renderer also instantiates an instance of RealTOC object 314 and hands to it the URL for toc.xml, the XML file describing the specific table of contents object associated with the multimedia presentation. This file includes the nodes and sub-nodes within hierarchical structure of the specific table of contents; it also includes the "begin" and "end" times corresponding to each node and sub-node. RealTOC retrieves the toc.xml file, parses it, and builds the specific table of contents tree structure. A sample toc.xml file appears in FIG. 5.

At the beginning of the multimedia presentation, RealVideo object 302 creates a video window for rendering video, while RealTOC creates a TOC window for rendering the table of contents. Both windows are rendered within the larger RealPlayer™ window. As the time-line increases during the presentation, RealPlayer™ 301 periodically calls SAL 310 with the current time; SAL 310 passes the current time to JVM 313, which in turn notifies RealTOC 314; RealTOC 314 highlights the appropriate node on the table of contents tree rendered in the TOC window. A similar process can be constructed with the SAL keeping current time and calling the RealPlayer™ with time updates.

When the user clicks on a particular heading within the table, RealTOC 314 sends the "begin" time associated with the heading to the "seek" function of RealPlayer™ 301 through JVM 313 and SAL 310; RealPlayer™ 301 notifies all synchronized media servers (not shown) of the new "begin" time, waits for the all the media servers to synchronize to the new time, then updates its internal current time and sends the new current time to its extension modules, i.e., RealVideo 302 and SAL 310 (and RealText 103, if applicable); SAL 310 updates the current time of RealTOC 314 through JVM module 313. Importantly, both RealTOC 314 and RealVideo 302 are both synchronized to the current time of RealPlayer™ 301. Thus, after RealTOC 314 invokes the seek function requesting a new time, its current time does not skip to the new time until RealPlayer™ 301 notifies RealTOC 314 of the change in current time. If the seek function in RealPlayer™ 301 is disabled, as it should be for live video, the time line continues uninterrupted.

Seek function is only one example of controlling the flow of data. Fast forward and rewind functions also control the flow of data by changing the rate of the flow. Moreover, as discussed previously, the data can be arranged in multiple dimensions; then, its flow direction is a vector whose direction may be controlled from the extension module in a way similar to the control of data flow from the table of contents described above.

Although a specific embodiment of this invention has been shown and described, it will be understood that various modifications may be made without departing from the spirit of this invention.

APPENDIX A

```
/* $Header: /cvs/RealJava/src/rjavar/java/com/softcom/realjava/plugins/RealTOC.java,v 1.17
1999/05/20 20:47:42 aw Exp $ */
// Copyright © 1998 SoftCom, Inc. All Rights Reserved.
package com.softcom.realjava.plugins;
import javax.swing.*;
import javax.swing.tree.*;
import java.awt.*;
import java.awt.event.*;
import java.io.IOException;
import java.net.URL;
import java.net.MalformedURLException;
import org.xml.sax.*;
import com.microstar.xml.SAXDriver;
import com.softcom.realjava.*;
import com.softcom.realjava.time.*;
```

APPENDIX A-continued

```
/**
 * Synchronized table of contents plugin.
 * Displays a table of contents (TOC) whose nodes are highlighted
 * in sync with the presentation. Clicking on a node seeks the
 * presentation to that nodes time.
 * <P>
 * <CODE>RealTOC</CODE> understands a <CODE>URL </CODE> param which
 * refers to an XML document specifying a hierarchical TOC.
 * <P>
 * Sample XML object element:
 * <P> <TABLEBORDER=1> <TR> <TD>
 * <PRE>
 * <?xml version="1.0"?>
 * <object
 *     classid = "com.softcom.realjava.plugins.RealTOC"
 *     archive = "plugin.jar,sax.jar,aelfred.jar"
 *     width="250" height="235"
 *     sync="1000"
 *     duration="900000"
 *     >
 *     <param name="URL" value="toc.xml"/>
 * </object> </PRE>
 * </TD> </TR> </TABLE> <P>
 * This is the <CODR>TOC</CODE> XML DTD.
 * <CODE>BEGIN</CODE> and <CODE>END</CODE> are times specified
<* in the format documented in <CODE> TimeSpanRegistry.parseTime( ) </CODE>.
 * Both are optional, but if either is specified, then both must be specified.
 * <P> <TABLE BORDER=1> <TR> <TD>
 * <PRE>
 * <!ELEMENT TOC (NODE+)>
 * <!ELEMENT NODE (TITLE, NODE*)>
 * <!ATTLIST NODE
 *     BEGIN CDATA #IMPLIED
 *     END CDATA #IMPLIED
 * >
 * <!ELEMENT TITLE (#PCDATA)> </PRE>
 * </TD> </TR> </TABLE> <P>
 * Sample <CODE> TOC </CODE> XML document:
 * <P> <TABLE BORDER=1> <TR> <TD>
 * <PRE>
 * <?xml version="1.0"?>
 * <TOC>
 *     <NODE BEGIN="0" END="4.999">
 *         <TITLE>Root node one</TITLE>
 *         <NODE BEGIN = "5" END = "9.999">
 *             <TITLE>Node one child</TITLE>
 *             <NODE BEGIN = "10" END = "14.999">
 *                 <TITLE>Node one subchild 1</TITLE>
 *             </NODE>
 *             <NODE>
 *                 <TITLE>Node one subchild 2</TITLE>
 *             </NODE>
 *         </NODE>
 *     </NODE>
 * </TOC> </PRE>
 * </TD> </TR> </TABLE> <P>
 * RealTOC uses the AElfred XML parser and the SAX XML API.
 * See <A TARGET="_top"
HREF = "http://www.microstar.com/aelfred.html" > http://www.microstar.com/aelfred.html </A>
 * for information on the AElfred XML parser.
 * See <A TARGET="_top"
HREF = "http://www.microstar.com/sax.html" > http://www.microstar.com/sax.html </A>
 * for information on the SAX API to XML parsers.
 */
public class RealTOC extends JScrollPane implements Plugin {
    private static final String MESSAGE_CATALOG =
"com.softcom.realjava.plugins.RealTOCMessages";
    private PluginContext m_pcContext;
    private JTree m_jcTree;
    private TimeSpanRegistry m_tsrRegistry = new TimeSpanRegistry( );
    private static final String DTD = "toc.dtd";
    // Implements Plugin
    public Synchronized getSynchronized( ) {
        return m_tsrRegistry;
    }
    // Implements Plugin
    public void startPlugin(PluginContext pc) {
        m_pcContext = pc;
```

APPENDIX A-continued

```java
        // Construct AElfred SAX driver
        Parser parser = new SAXDriver( );
        // Set parser to handle the XML document.
        parser.setDocumentHandler(new TOCParser( ));
        String strURL = m__pcContext.getParameter("URL");
        try {
            if (strURL == null)
                throw new MalformedURLException( );
            URL url = new URL(m__pcContext.getDocumentBase( ), strURL);
            InputSource is = new InputSource(url.openStream( ));
            // Pass URL to DTD
            is.setSystemId(getClass( ).getResource(DTD).toString( ));
            // Parse the document
            parser.parse(is);
        } catch (MalformedURLException e) {
            Console.showConsole( );
            System.err.println(MessageCatalog.getMessage(MESSAGE__CATALOG,
getClass( ), "msg.inf.invalidURL", strURL));
        } catch (IOException e) {
            Console.showConsole( );
            System.err.println(MessageCatalog.getMessage(MESSAGE__CATALOG,
getClass( ), "msg.inf.parse"));
            e.printStackTrace( );
        } catch (SAXException e) {
            Console.showConsole( );
            System.err.println(MessageCatalog.getMessage(MESSAGE__CATALOG,
getClass( ), "msg.inf.parse"));
            Exception ee = e.getException( );
            if (ee == null)
                e.printStackTrace( );
            else
                ee.printStackTrace( );
        }
        // Add the tree
        getViewport( ).add(m__jcTree, BorderLayout.CENTER);
    }
    // Implements Plugin
    public void destroyPlugin( ) {
    }
    // Object registered with event registry for each TOC event.
    // This object is also set as the TreeNode userObject
    private class TOCEvent implements TimeSpanListener {
        // Text to display in tree node
        private String m__strText;
        // −1 if no seek time specified
        private int m__nTime = −1;
        // Path to node this event is associated with
        private TreePath m__tpPath;
        public TOCEvent(DefaultMutableTreeNode tn) {
            m__tpPath = new TreePath(tn.getPath( ));
        }
        // Set text to display in tree node
        void setText(String strText) {
            m__strText = strText;
        }
        // Set time to seek media to tree node selected
        public void setTime(int nTime) {
            m__nTime = nTime;
        }
        // Return seek time
        public int getTime( ) {
            return m__nTime;
        }
        // Event time reached, highlight tree node
        // Implements TimeSpanListener
        public void beginTimeSpan(TimeSpan ts) {
            // Select this tree node. This will make it visible too.
            m__jcTree.addSelectionPath(m__tpPath);
        }
        // Implements TimeSpanListener
        public void endTimeSpan(TimeSpan ts) {
            // Deselect this tree node.
            m__jcTree.removeSelectionPath(m__tpPath);
        }
        // This is used by JTree to draw the node
        public String toString( ) {
            return m__strText;
        }
    };
```

APPENDIX A-continued

```
    private class TOCParser extends HandlerBase {
        // Root of tree
        private DefaultMutableTreeNode m_tnRoot;
        // Current parent node
        private DefaultMutableTreeNode m_tnParent;
        // Current child node
        private DefaultMutableTreeNode m_tnCurrent;
        // Title text accumulator
        private StringBuffer m_sbText = new StringBuffer( );
        private boolean m_bAccumulateText = false;
        // Overrides HandlerBase
        public void startElement(String strName, AttributeList attrs) throws SAXException
{
        if (strName.equals("TOC")) {
            // Create hidden root of tree
            m_tnRoot = m_tnCurrent = new DefaultMutableTreeNode( );
        }
        else if (strName.equals("NODE")) {
            m_tnParent = m_tnCurrent;
            // Create a new node
            m_tnCurrent = new DefaultMutableTreeNode( );
            // Add node as a child of the current node
            m_tnParent.add(m_tnCurrent);
            // Create event for node
            TOCEvent te = new TOCEvent(m_tnCurrent);
            m_tnCurrent.setUserObject(te);
            // Set time on event if specified
            String strBegin = attrs.getValue("BEGIN");
            if (strBegin != null) {
                String strEnd = attrs.getValue("END");
                if (strEnd == null)
                    throw new
SAXException(MessageCatalog.getMessage(MESSAGE_CATALOG, getClass( ),
"msg.ex.missingTime"));
                try {
                    int nBeginTime = TimeSpanRegistry.parseTime(strBegin);
                    int nEndTime = TimeSpanRegistry.parseTmme(strEnd);
                    // Set seek time in event
                    te.setTime(nBeginTime);
                    // Register event with the TOC timespan registry
                    m_tsrRegistry.addTimeSpan(new TimeSpan(te, nBeginTime,
nEndTime));
                } catch (NumberFormatException e) {
                    throw new
SAXException(MessageCatalog.getMessage(MESSAGE_CATALOG, getClass( ),
"msg.ex.invalidTime"), e);
                }
            }
        }
        else if (strName.equals("TITLE")) {
            // Reset String Buffer for new title
            m_sbText.setLength(0);
            m_bAccumulateText = true;
        }
        // Invalid element
        else
            throw new
SAXException(MessageCatalog.getMessage(MESSAGE_CATALOG, getClass( ),
"msg.ex.invalidElement", strName));
    }
    // Overrides HandlerBase
    public void endElement(String strName) throws SAXException {
        if (strName.equals("TOC")) {
            // Finished building tree. Setup JTree with model.
            // Create the tree with the constructed nodes
            m_jcTree = new JTree(m_tnRoot);
            m_jcTree.setRootVisible(false);
            m_jcTree.setShowsRootHandles(true);
            // Allow multiple selection so we can support overlapping timespans
m_jcTree.getSelectionModel( ).setSelectionMode(TreeSelectionModel.DISCONTIGUOUS_TR
EE_SELECTION);
            // When a tree node is clicked (regardless of whether it was selected),
            // seek the video to the TOCEvent time registered with the node
            m_jcTree.addMouseListener(new MouseAdapter( ) {
                // XXX mouseClicked is unreliable - it is not always called (bugid
```

APPENDIX A-continued

```
4224704)
                            //public void mouseClicked(MouseEvent e) {
                            public void mouseReleased(MouseEvent e) {
                                // Only handle single clicks
                                if (e.getClickCount( ) != 1)
                                    return;
                                // Get the path and node clicked on
                                TreePath path = m__jcTree.getPathForLocation(e.getX( ),
e.getY( ));
                                if (path != null) {
                                    // Get the event registered with this node
                                    TOCEvent te =
(TOCEvent)((DefaultMutableTreeNode)path.getLastPathComponent( )).getUserObject( );
                                    if (te != null && te.getTime( ) >= 0) {
                                        // Seek the video
                                        m__pcContext.seekPlayer(te.getTime( ));
                                    }
                                }
                            }
                        });
                }
                else if (strName.equals("NODE")) {
                    // Back up a level
                    m__tnCurrent = (DefaultMutableTreeNode)m__tnCurrent.getParent( );
                }
                else if (strName.equals("TITLE")) {
                    // Give title to current node
((TOCEvent)m__tnCurrent.getUserObject( )).setText(m__sbText.toString( ));
                    m__bAccumulateText = false;
                }
            }
            // Overrides HandlerBase
            public void characters(char ch[ ], int nStart, int nLength) throws SAXException {
                if (m__bAccumulateText)
                    m__sbText.append(ch, nStart, nLength);
            }
        };
        /*
        // XXX debugging
        public static void main(String args[ ]) {
            Frame frm = new Frame( );
            frm.setLayout(new BorderLayout( ));
            RealTOC rt = new RealTOC( );
            rt.startPlugin(new PluginContext( ) {
                public URL getCodeBase( ) {
                    try {
                        return new
URL("file:S:/projects/realjava/src/rjavar/plugclasses/");
                    } catch (MalformedURLException e) {
                        return null;
                    }
                }
                public String getParameter(String strParam) {
                    return "toc.xml";
                }
                public int getDuration( ) {
                    return 0;
                }
                public void seekPlayer(int nTime) {
                }
                public void showDocument(URL url, String strTarget) {
                }
            });
            frm.add(rt, BorderLayout.CENTER);
            frm.setSize(300, 300);
            frm.setVisible(true);
        }
        */
}
```

We claim:

1. A computer system having at least a processor using an extension layer for extending the functionality of a framework which is separate from an operating system, comprising:

a first framework;

a first access system coupled to said first framework and which interacts with said first framework;

a second framework, different from said first framework;

a second access system coupled to said second framework and which interacts with the second framework;
an extension module;
an extensible abstraction layer framework; and
a coupling system for connecting said extension module to said extensible abstraction layer framework thereby providing access to said extension module;
wherein the extension layer provides a uniform, cross-platform, framework-independent interface between said first and second frameworks and said extension module.

2. The computer system of claim 1 further comprising:
a synchronization system for synchronizing data from said extension module.

3. The computer system of claim 2 further comprising:
a communication system allowing for the transfer of data or instructions between said extension module and said extensible abstraction layer framework.

4. A computer system having at least a processor using an extension layer for accessing and using an ordered file, comprising:

a first extensible ordered-data flow-based framework;
a second extensible ordered-data flow-based framework which is not identical to said first extensible ordered-data flow-based framework;
an extensible ordered-data flow-based abstraction layer framework;
an extension module for an extensible ordered-data flow-based abstraction layer framework containing ordered data;
an abstraction layer having a uniform cross-platform interface between said extension module and said extensible ordered-data flow-based framework, said abstraction layer being separate from an operating system; and
a synchronization module for handling data flowing between the extension module and the extension layer;
wherein the extension layer provides a uniform, cross-platform, framework-independent interface between the first and second frameworks and the extension module.

* * * * *